(12) United States Patent
Choi et al.

(10) Patent No.: US 8,878,101 B2
(45) Date of Patent: Nov. 4, 2014

(54) HEATING ELEMENT AND METHOD FOR MANUFACTURING SAME

(71) Applicant: LG Chem, Ltd., Seoul (KR)

(72) Inventors: Hyeon Choi, Daejeon (KR); Ki-Hwan Kim, Daejeon (KR); Sujin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/092,550

(22) Filed: Nov. 27, 2013

(65) Prior Publication Data

US 2014/0083991 A1   Mar. 27, 2014

Related U.S. Application Data

(63) Continuation of application No. PCT/KR2013/002354, filed on Mar. 21, 2013.

(30) Foreign Application Priority Data

Apr. 23, 2012   (KR) .................. 10-2012-0042123

(51) Int. Cl.
*B60L 1/02*   (2006.01)
*H05B 3/10*   (2006.01)
*H05B 3/84*   (2006.01)
*B60S 1/02*   (2006.01)
*H01C 17/06*   (2006.01)
*H05B 3/00*   (2006.01)

(52) U.S. Cl.
CPC ........... *B60S 1/026* (2013.01); *H05B 2203/007* (2013.01); *H05B 3/10* (2013.01); *H05B 3/84* (2013.01); *H05B 2203/013* (2013.01); *H01C 17/06* (2013.01); *H05B 2203/037* (2013.01)
USPC .............................. 219/203; 29/611; 219/553

(58) Field of Classification Search
USPC ................. 219/203, 552–3, 213–4, 218, 219; 29/611
See application file for complete search history.

(56) References Cited

U.S. PATENT DOCUMENTS

2006/0157462 A1   7/2006   Weiss et al.
2011/0042370 A1*  2/2011   Choi et al. .................... 219/553

FOREIGN PATENT DOCUMENTS

| JP | 2010-205432 A | 9/2010 |
| JP | 2010251230 A | 11/2010 |
| JP | 2012-014956 A | 1/2012 |
| KR | 10-0290601 B1 | 9/2001 |
| KR | 10-2009-0099502 A | 9/2009 |
| KR | 1020090113758 A | 11/2009 |
| KR | 10-2012-0011263 A | 2/2012 |

* cited by examiner

*Primary Examiner* — Shawntina Fuqua
(74) *Attorney, Agent, or Firm* — McKenna, Long & Aldridge LLP

(57) ABSTRACT

The present specification relates to a heating element in which a heating value for each region is controlled or a heating element in which the heating value for each region is controlled and which is inconspicuous, and a method for manufacturing the same.

17 Claims, 8 Drawing Sheets

(a)

(b)

(c)

HEATING ELEMENT AND METHOD FOR MANUFACTURING SAME

This application is a Continuation of International Application No. PCT/KR2013/002354, filed Mar. 21, 2013, and claims priority to and the benefit of Korean Patent Application No. 10-2012-0042123, filed on Apr. 23, 2012, the disclosure of which is incorporated herein by reference in its entirety.

TECHNICAL FIELD

The present invention relates to a heating element and a manufacturing method thereof. More particularly, the present invention relates to a heating element in which a heating value for each region is controlled, and a method for manufacturing the same.

BACKGROUND ART

When there is a temperature difference between the outside and the inside of a vehicle, moisture or frost is formed on the windows of the vehicle. Further, in the case of an indoor ski rink, condensation occurs due to a temperature difference between the inside with a slope and the outside of the slope. In order to solve the problem, heating glass may be used. The heating glass uses a concept of generating heat from a heating line by attaching a heating line sheet to the glass surface or directly forming the heating line on the glass surface and applying electric power to both terminals of the heating line, thereby increasing a temperature of the glass surface.

In order to manufacture the heating glass, there have been proposed methods of forming a total surface heating layer through a sputtering process using a transparent conductive material such as an indium tin oxide (ITO) or an Ag thin film and then connecting an electrode to a front end thereof. However, there is a problem in that it is difficult to drive the heating glass manufactured by the methods at low voltage due to high surface resistance. Accordingly, when heat is to be generated at low voltage, attempts have been proposed to use a heating line such as a metal line.

DETAILED DESCRIPTION OF THE INVENTION

Technical Problem

In a heating element, a heating value for each region is required to be controlled according to the use thereof. In addition, a characteristic that a heating value for each region may be controlled while being inconspicuous to a user according to the use thereof may be required for the heating element. In order to satisfy the aforementioned required characteristics, the present inventors have repeatedly studied on a heating element in which a heating value for each region is controlled, or a heating element in which a heating value for each region is controlled and which is inconspicuous to a user, thereby completing the present invention.

Technical Solution

An exemplary embodiment of the present invention provides a heating element comprising:
a substrate;
a conductive heating pattern provided on the substrate; and
two bus bars provided so as to apply voltage to both ends of the conductive heating pattern, respectively,
in which the conductive heating pattern comprises a border form of a closed figure, and an average area of the closed figure is controlled in at least some regions of the conductive heating pattern according to a distance from the bus bar or along a longitudinal direction of the bus bar.

Another exemplary embodiment of the present invention provides a method for manufacturing a heating element, the method comprising:
forming a conductive heating pattern on a substrate; and
forming two bus bars on the substrate so as to apply voltage to both ends of the conductive heating pattern,
in which the conductive heating pattern comprises a border form of a closed figure, and is formed such that an average area of the closed figure is controlled in at least some regions of the conductive heating pattern according to a distance from the bus bar or along a longitudinal direction of the bus bar.

Advantageous Effects

According to an exemplary embodiment of the present invention, it is possible to provide a heating element in which a heating value for each region is controlled. Furthermore, according to another exemplary embodiment of the present invention, it is possible to provide a heating element in which a heating value for each region is controlled and which is inconspicuous to a user.

BEST MODE

Hereinafter, the present invention will be described in more detail.

A heating element according to an exemplary embodiment of the present invention comprises: a substrate; a conductive heating pattern provided on the substrate; and two bus bars provided so as to apply voltage to both ends of the conductive heating pattern, respectively, in which the conductive heating pattern comprises a border form of a closed figure, and an average area of the closed figure is controlled in at least some regions of the conductive heating pattern according to a distance from the bus bar or along a longitudinal direction of the bus bar.

Figure 1:
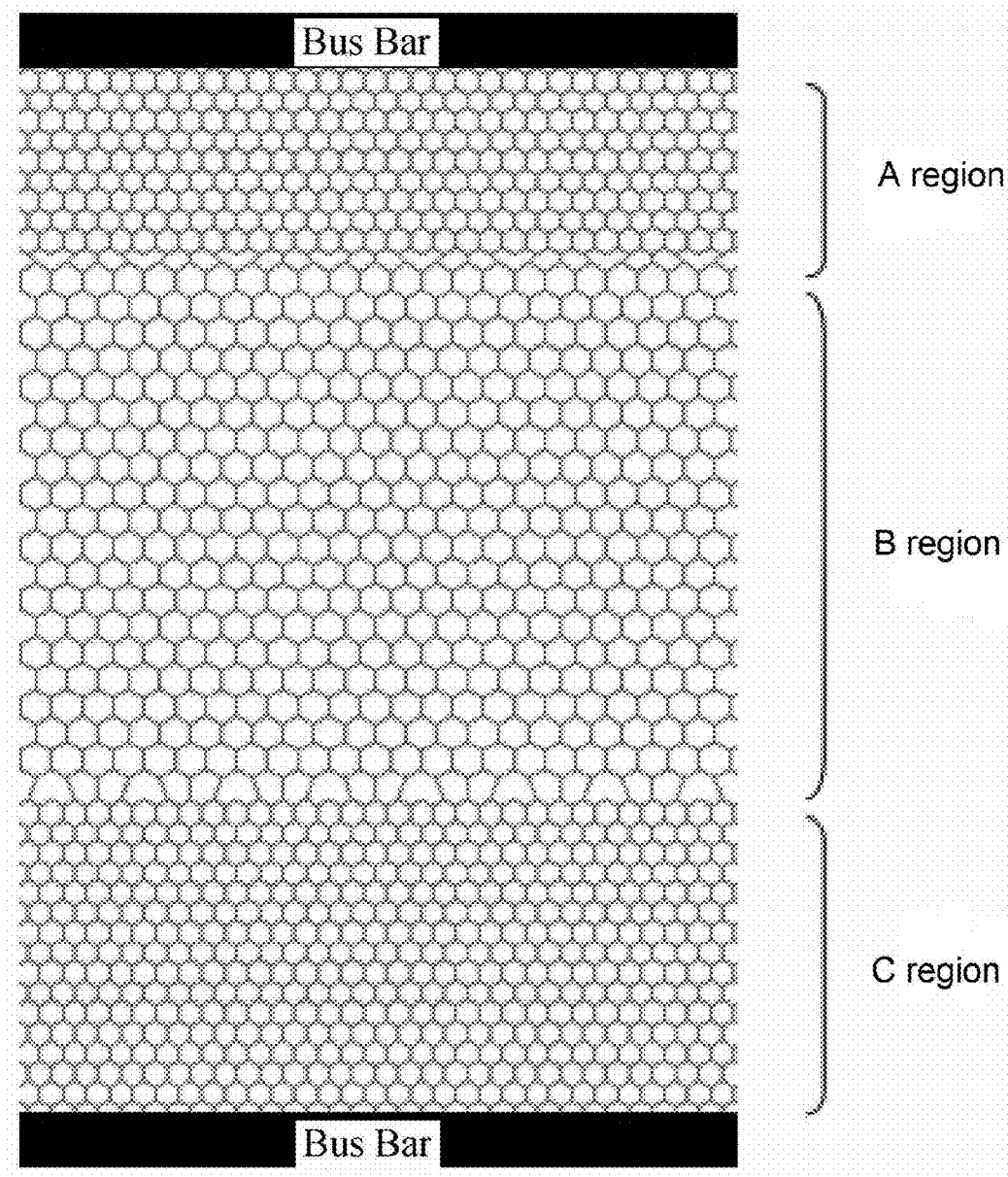
FIG. 1 illustrates a form in which an average area of a closed figure constituting a conductive heating pattern is controlled according to a distance from a bus bar.

In the present invention, a heating value may be controlled according to a distance from the bus bar or along a longitudinal direction of the bus bar by varying an average area of a closed figure according to a distance from the bus bar or along the longitudinal direction of the bus bar in at least some regions in a conductive heating pattern comprising a border form of the closed figure. Specifically, a resistance value between the two bus bars is determined by the average area of the border of a closed figure constituting the conductive heating pattern, and a heating element having a different heating value for each region may be provided by controlling the average area of the closed figure. FIG. 1 illustrates a form of the conductive heating pattern of the heating element according to an exemplary embodiment of the present invention.

The closed figure is not particularly limited as long as the average area thereof may be calculated. For example, the closed figure may be a polygon having at least three vertices or a figure modified therefrom. The modification method will be described below.

In the present invention, the conductive heating pattern may also comprise only the borders of a closed figure having the same form, but may comprise the borders of two or more closed figures having different forms. For example, the conductive heating pattern may also comprise only the border form of closed figures having four vertices. As another example, the conductive heating pattern may comprise only the border form of closed figures having six vertices. As yet another example, the conductive heating pattern may comprise the border form of closed figures in a state where two or more closed figures among the closed figures having three to eight vertices are mixed and disposed.

As an example, in a pattern comprising the form of the border of a closed figure having four to six vertices, the conductive heating pattern has a pattern in which the average area of the closed figure is controlled according to a distance from the bus bar or along a longitudinal direction of the bus bar.

As another example, the conductive heating pattern may comprise the form of the border of a rectangle, a regular tetragon, a hexagon or a regular hexagon, or a figure modified from these figures, and the average area of the figures may be controlled according to the distance from the bus bar or along the longitudinal direction of the bus bar. In a polygon such as the regular tetragon, the rectangle, the regular hexagon or the hexagon, the position of a vertex or the curvature degree of a line may be modified.

Figure 3:
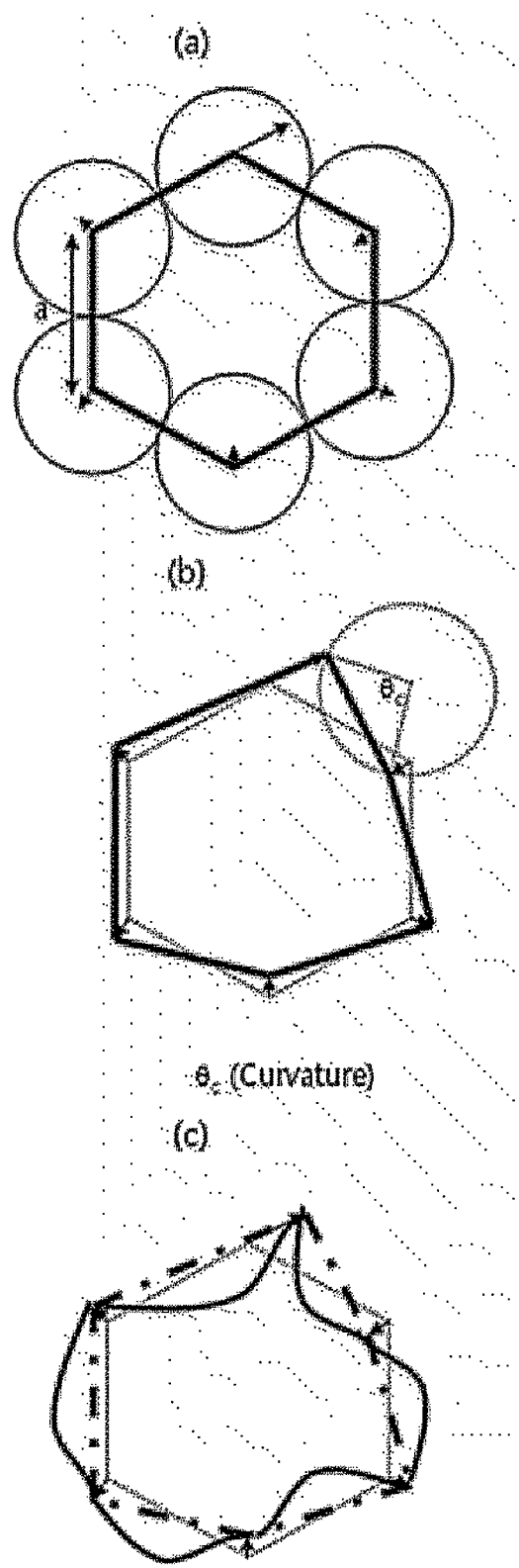
FIG. 3 illustrates a method of modifying a right hexagon.

The conductive heating pattern is advantageous in preventing a diffraction problem caused by a single light when the pattern comprises a pattern having limited regularity rather than a regular pattern. Accordingly, as a method for designing a pattern having limited regularity, it is possible to use a method of modifying the position of a vertex or the curvature degree of a line of a polygon having at least three vertices. FIG. 3 illustrates specific examples thereof.

As an example, it is possible to use a polygon having three or more vertices in order to design a closed figure having three or more vertices. A modified figure may be designed by arbitrarily changing the position of a vertex in the form of the polygon.

Additionally, in order to prevent the changed position of a vertex from being the same as the position of another vertex, as illustrated in FIG. 3(a), a unit region in which the position of each vertex may be changed is determined, and then each vertex is moved to any point in each unit region as illustrated in FIG. 3(b).

As another example, lines constituting the border of the polygon may be modified into various forms. For example, the lines may be simply a straight line, a curved line, a zig-zag line, or a combination thereof. For example, lines of the figure in FIG. 3(a) or 3(b) may be modified to various forms.

Examples of a method of forming a curved line are as follows. For example, the line may be modified to the form of a circumference of a circle passing through two adjacent vertices of the polygon. In this case, when each straight line is drawn to two vertices of the polygon from the origin of the circle, a pattern as illustrated in FIG. 3(c) may be designed by selecting a circle of which an angle (θc) between the two straight lines is constant, and then connecting each vertex along the circumference of the circle.

Figure 4:
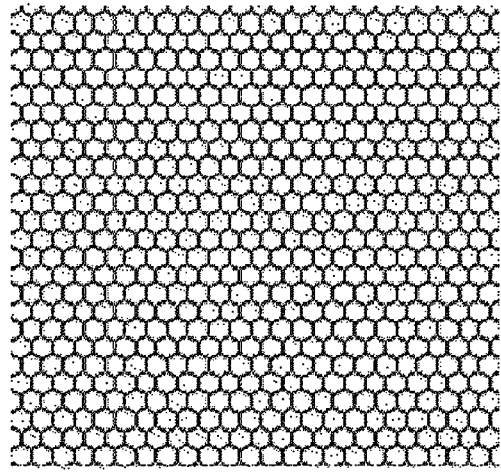
FIG. 4 illustrates a form of a pattern modified from a regular hexagon.
Figure 4:
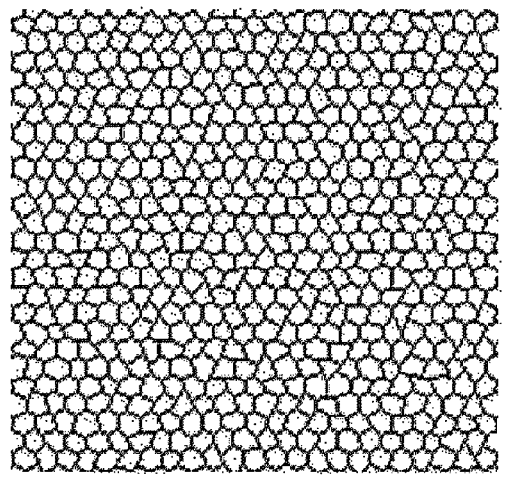
Figure 4:
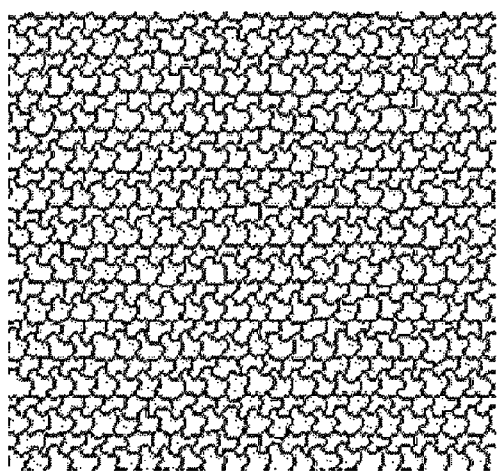

FIG. 4 illustrates an example of a pattern which may be prepared based on what is illustrated in FIG. 3 for each step. FIGS. 4(a), 4(b), and 4(c) are designed in the same manner as in FIGS. 3(a), 3(b), and 3(c), respectively.

The conductive heating line pattern may be formed in a border form of figures constituting the Voronoi diagram. In this case, by reducing the regularity of the pattern, Moiré may be prevented and the side effects due to diffraction and interference of light may be minimized. The Voronoi diagram is a pattern formed by a method of disposing respective points in a region in which the pattern is to be filled using a Voronoi diagram generator, and filling a region which is the closest in distance to the corresponding point compared to the distance from the points to the other points. For example, when it is assumed that nationwide superstores are indicated as points and consumers visit the closest superstore, a pattern which displays the commercial territory of each store may be exemplified. That is, when the space is filled with right hexagons and respective points of the right hexagons are selected as a reference point, a honeycomb structure may become the conductive heating line pattern. When a conductive heating line pattern is formed using a Voronoi diagram generator, there is an advantage in that it is possible to easily determine a complex pattern form which may minimize the side effects due to diffraction and interference of light.

In the present invention, during the formation of the Voronoi diagram, a pattern derived from the right hexagon may be used by regularly or irregularly disposing the position of reference points.

Even when the conductive heating line pattern is formed in a border form of figures constituting the Voronoi diagram, the regularity and irregularity may be appropriately balanced during the production of reference points in order to solve the aforementioned visual cognition problem. For example, after an area having a predetermined size is designated as a basic unit in an area where a pattern enters, a point is produced such that the distribution of points in the basic unit is irregular, and then the Voronoi pattern may also be prepared. When such a method is used, visibility may be compensated by preventing the distribution of patterns from being concentrated at one point.

Figure 7:
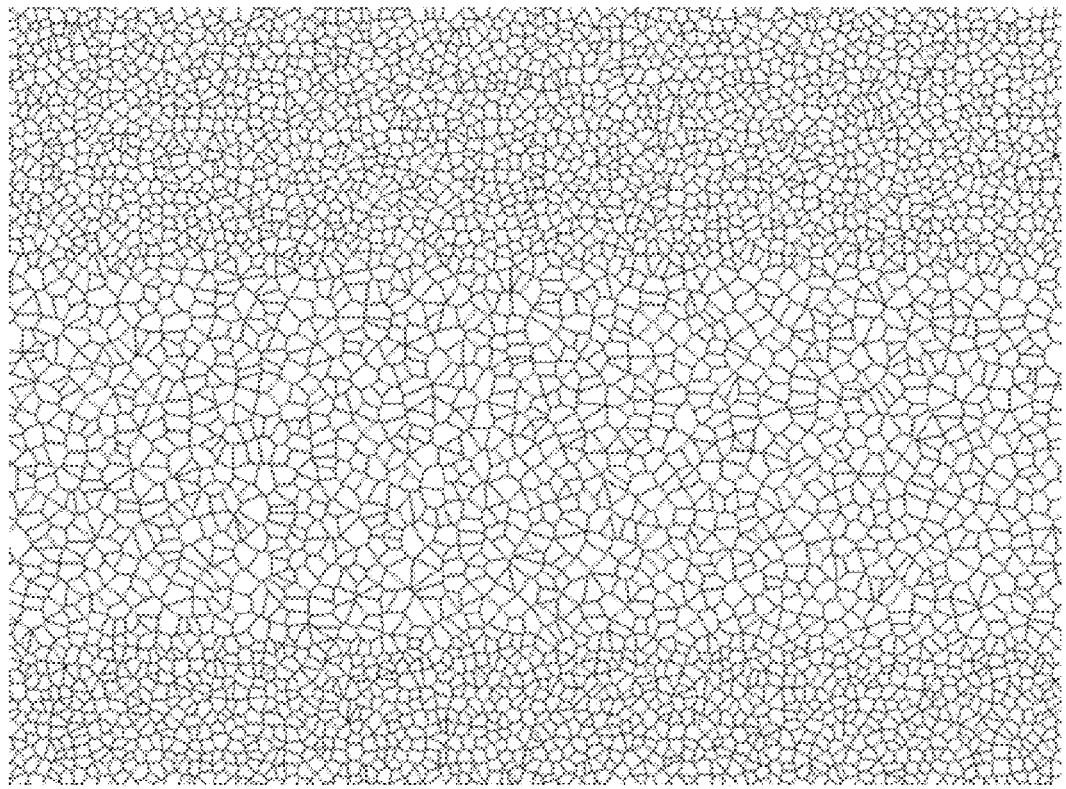
FIG. 7 illustrates an example in which the average area of the closed figure is controlled in the heating element according to an exemplary embodiment of the present invention.

The average area of the closed figure may be controlled by controlling the size of the basic unit. FIG. 7 illustrates an example in which the average area of the closed figure is controlled.

As described above, the number of reference points in the basic unit may be controlled in order to consider the visibility of the pattern or control the heating density thereof. In this case, when the number of reference points in the basic unit is controlled, the basic unit is preferably 5 $cm^2$ or less, and more preferably 1 $cm^2$ or less. The number of reference points in the basic unit may be selected within 25 to 2,500 ea/$cm^2$, and may be selected within 100 to 2,000 ea/$cm^2$.

In the present invention, the average area of the closed figure may be controlled to be different for each region according to the distance from the bus bar or along the longitudinal direction of the bus bar. For example, the present invention may comprise two or more regions or three or more regions having different average areas of the closed figure per unit area. Here, it is preferred that the basic unit for controlling the average area of the closed figure is designed to be from 0.025 to 4 mm².

In this case, it is preferred that in the conductive heating pattern, the ratio of the average area of the closed figure per unit area is a value from 1.1 to 4 among the two or more regions. In this case, the ratio is a ratio of a high average area value of the closed figure per unit area to a small average area value of the closed figure unit area. When the ratio is 4 or less, the density difference of the pattern may be prevented from being conspicuous by preventing deviation in the aperture ratio from being increased due to pattern density. Further, when the ratio is 1.1 or more, it is advantageous to achieve the object of the present invention by preventing deviation in the heating value from being decreased.

Examples thereof comprise a case where a pattern having the same line width is implemented as a conductive heating pattern in a windshield of a vehicle, and a bus bar is provided at the upper end and lower end of the windshield of the vehicle, respectively. In this case, since the length of the upper end of the windshield of the vehicle is shorter than that of the lower end thereof, the upper end portion of the windshield of the vehicle may be heated more rapidly than the lower end portion thereof. However, in the case of the windshield of the vehicle, it is advantageous to heat the viewing region of a driver before anything else in order to secure the driver's view. For example, an air outlet for removing moisture and frost in the windshield of the vehicle is positioned in the viewing region of the driver in order to solve the aforementioned problems.

Accordingly, when a heating element is applied to the windshield of the vehicle, a form of a conductive heating pattern may be designed such that first, defrost may be performed or frost may be removed from the viewing region of the driver.

As a specific example, the conductive heating pattern may be designed from a right hexagon. In the honeycomb structure comprising the right hexagon illustrated in FIG. 2, the resistance value between the bus bars is determined by the area of the right hexagon. That is, when electric current flows due to voltage applied between the bus bars, the resistance is increased when the area of the right hexagon is large, and the resistance is decreased when the area of the right hexagon is small.

Figure 2:
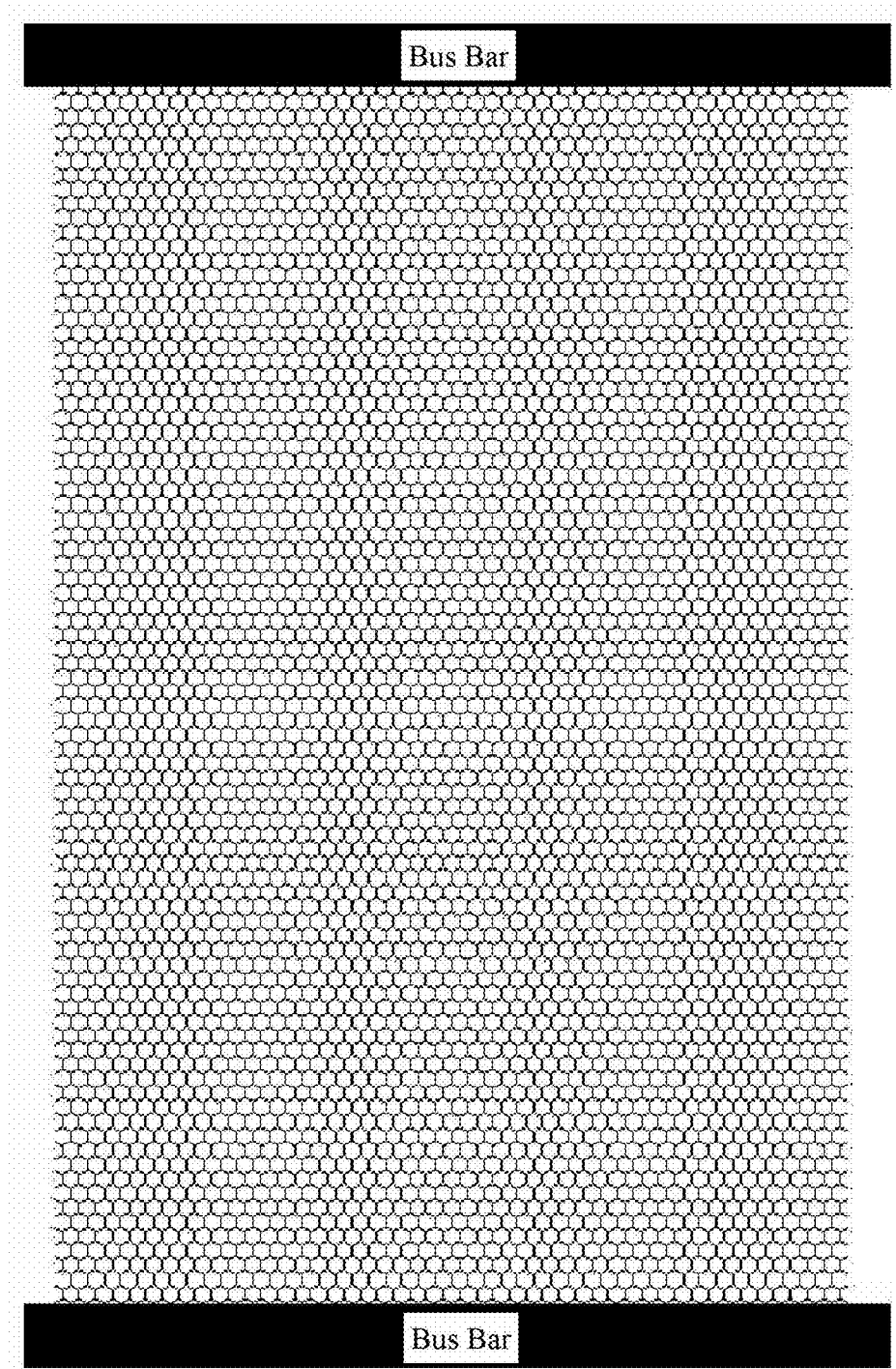
FIG. 2 illustrates a pattern composed of a right hexagon border form.

The pattern illustrated in FIG. 1 may be obtained by dividing the region in the pattern illustrated in FIG. 2 into three regions, and then changing the average area of the right hexagon at a ratio of 9:16:9 (A:B:C region).

The ratio of the surface resistance values of the three regions illustrated in FIG. 1 has a proportional relationship with the square root of the area of the right hexagon. Since the three regions are connected in series and the electric current values thereof are the same as each other, the ratio of the heating values per area for each region is 3:4:3.

FIG. 1 describes an example in which three regions are comprised, but the present invention is not limited to only the case where the three regions are comprised. The case where two or four or more regions are comprised is also comprised in the scope of the present invention.

In the present specification, a value, which is obtained by converting an area, which the pattern comprising the border form of the closed figure does not occupy, into a ratio with respect to the total area, may be defined as an aperture ratio. As described above, when the average area of the closed figure is controlled according to the distance from the bus bar or along the longitudinal direction of the bus bar, the difference in aperture ratio for each region may be controlled so as to be 5% or less, preferably 3% or less. In this case, it is possible to perform defrost and remove frosts from a region having a large heating value by achieving uniform heating characteristics for each region, and to prevent a boundary caused by a difference in aperture ratio between regions from being recognized to a user. In particular, even when the conductive heating pattern is composed of a metal line, the problem in that the pattern may be conspicuous may be minimized by controlling a difference in aperture ratio as described above.

Figure 8:
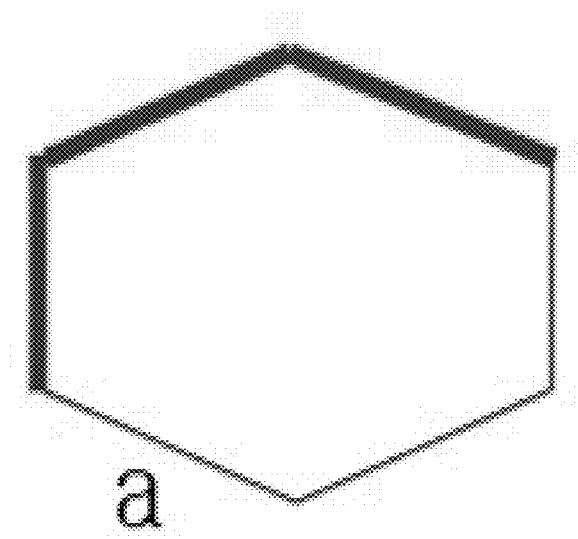
FIG. 8 illustrates a basic figure for calculating an aperture ratio of the pattern.

For example, the aperture ratio in the regular hexagonal structure of FIG. 2 may be calculated as follows. As illustrated in FIG. 8, when the length of a line is defined as a and the line width is defined as w, the area of the two regular hexagons is $3^{3/2}a^2/2$, and the area of three lines (indicated as red) is $3wa$. Accordingly, the aperture ratio (%) may be calculated as $100*[1-(6/3^{3/2})w/a]$, and when the difference in aperture ratio for each region according to the length (a) and the line width (w) of the line constituting the border of the closed figure is calculated according to the equations, a result in the following Table 1 is obtained. In the following Table 1, the region in which the closed figure is the smallest is Region A, and regions, which are 1.1 times and 4 times larger in area than Region A are designated as Region B and Region C, respectively. In addition, the value of the aperture ratio in the following Table 1 was described to the first digit after the decimal point among the calculated values for convenience, but the difference in aperture ratio was calculated using the total calculated values.

TABLE 1

| a (μm) in Region A | W (μm) | Aperture ratio (%) of Region A | Aperture ratio (%) of Region B | Aperture ratio (%) of Region C | Difference in aperture ratio (A − B, %) | Difference in aperture ratio (A − C, %) |
|---|---|---|---|---|---|---|
| 100 | 3 | 96.5 | 96.7 | 98.3 | 0.2 | 1.7 |
| 150 | 3 | 97.7 | 97.8 | 98.8 | 0.1 | 1.2 |
| 200 | 3 | 98.3 | 98.3 | 99.1 | 0.1 | 0.9 |
| 250 | 3 | 98.6 | 98.7 | 99.3 | 0.1 | 0.7 |
| 300 | 3 | 98.8 | 98.9 | 99.4 | 0.1 | 0.6 |
| 350 | 3 | 99.0 | 99.1 | 99.5 | 0.0 | 0.5 |
| 400 | 3 | 99.1 | 99.2 | 99.6 | 0.0 | 0.4 |
| 450 | 3 | 99.2 | 99.3 | 99.6 | 0.0 | 0.4 |
| 100 | 5 | 94.2 | 94.5 | 97.1 | 0.3 | 2.9 |
| 150 | 5 | 96.2 | 96.3 | 98.1 | 0.2 | 1.9 |
| 200 | 5 | 97.1 | 97.2 | 98.6 | 0.1 | 1.4 |
| 250 | 5 | 97.7 | 97.8 | 98.8 | 0.1 | 1.2 |
| 300 | 5 | 98.1 | 98.2 | 99.0 | 0.1 | 1.0 |
| 350 | 5 | 98.4 | 98.4 | 99.2 | 0.1 | 0.8 |

TABLE 1-continued

| a (μm) in Region A | W (μm) | Aperture ratio (%) of Region A | Aperture ratio (%) of Region B | Aperture ratio (%) of Region C | Difference in aperture ratio (A − B, %) | Difference in aperture ratio (A − C, %) |
|---|---|---|---|---|---|---|
| 400 | 5 | 98.6 | 98.6 | 99.3 | 0.1 | 0.7 |
| 450 | 5 | 98.7 | 98.8 | 99.4 | 0.1 | 0.6 |
| 100 | 8 | 90.8 | 91.2 | 95.4 | 0.4 | 4.6 |
| 150 | 8 | 93.8 | 94.1 | 96.9 | 0.3 | 3.1 |
| 200 | 8 | 95.4 | 95.6 | 97.7 | 0.2 | 2.3 |
| 250 | 8 | 96.3 | 96.5 | 98.2 | 0.2 | 1.8 |
| 300 | 8 | 96.9 | 97.1 | 98.5 | 0.1 | 1.5 |
| 350 | 8 | 97.4 | 97.5 | 98.7 | 0.1 | 1.3 |
| 400 | 8 | 97.7 | 97.8 | 98.8 | 0.1 | 1.2 |
| 450 | 8 | 97.9 | 98.0 | 99.0 | 0.1 | 1.0 |

In the present invention, it is preferred that 50 or more closed figures are present in each of the regions.

The number of vertices of the closed figures comprised in each of the regions may be designed to be the same as each other.

In the present invention, when a conductive heating pattern is designed based on a regular hexagonal structure, the length of lines constituting the border of the closed figure is preferably a value from 100 μm to 800 μm. Furthermore, it is preferred that the line width of lines constituting the conductive heating pattern is a value from 0.1 μm to 30 μm, more specifically from 3 μm to 10 μm.

According to the present invention, a transmittance deviation in a heating element may be controlled within 20% or less, 10% or less, or 5% or less. Further, the heating element may have a transmittance deviation of 10% or less, or 5% or less with respect to any circle having a diameter of 20 cm.

The heating element according to the present invention may be applied to glass used in various transportation means such as vehicles, ships, railways, rapid transit railways, and aircrafts, or houses or other buildings. In particular, the heating element according to the present invention is inconspicuous, and thus may also be applied to front glass or side glass of a transportation means such as vehicles, unlike the related art.

In the case of the front glass of the vehicle, the front glass itself is disposed so as to have a slope. Recently, the slope of the front glass tends to be gradually decreased further in order to minimize air resistance while the vehicle is driving. In order to prevent a problem in that the pattern may appear to be distorted vertically due to the slope of the front glass, it is advantageous to elongate the pattern vertically according to the slope when the aforementioned type of conductive heating pattern is used. For example, the closed figure may be designed so as to have a form in which the average distance between lines in the longitudinal direction is longer than the average distance between lines in the transverse direction. In an example, the average distance between lines of the closed figure in the longitudinal direction may be designed so as to be one time to ten times wider than that in the transverse direction.

Figure 5:
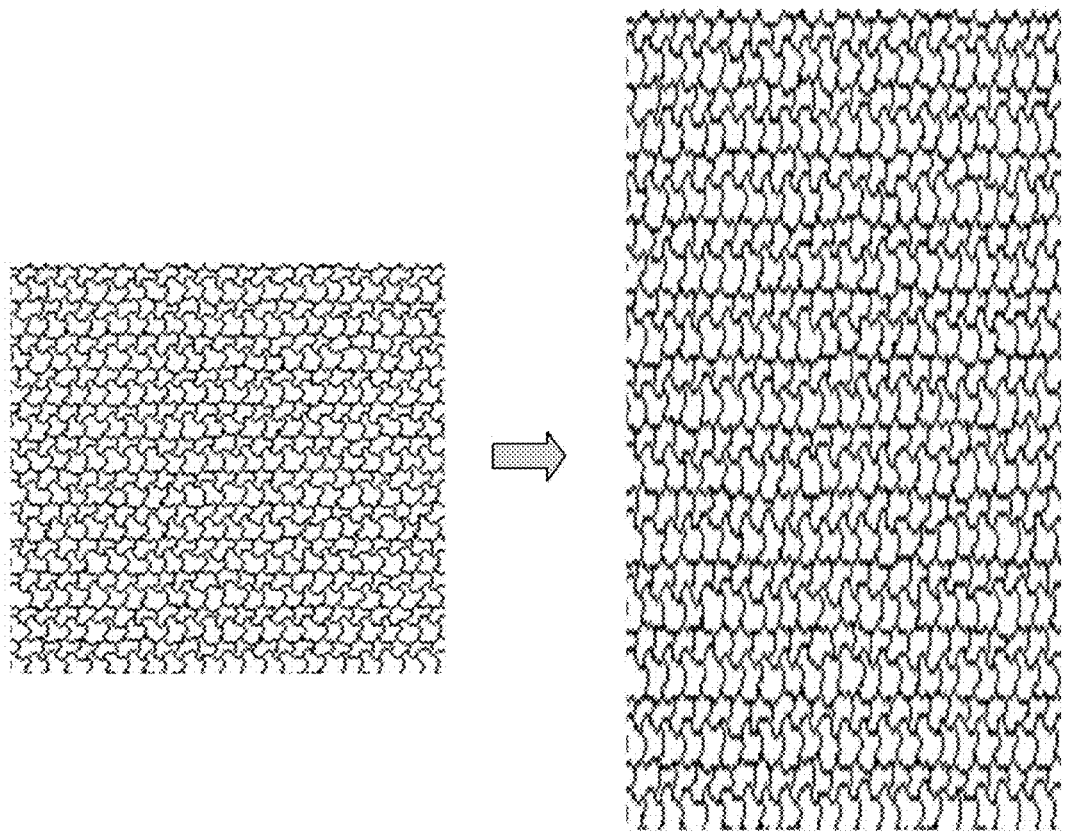
FIG. 5 illustrates an example in which when the heating element according to the present invention is applied to a windshield of a vehicle, the pattern is modified in consideration of a slope of the windshield of the vehicle.

For example, when the slope of the front glass is 30 degrees, it is preferred that the conductive heating pattern is elongated vertically by two times. FIG. 5 illustrates an example thereof.

In an example, when the heating element according to the present invention is applied to the windshield of the vehicle, the average area of the closed figure may be controlled according to the region classified as follows in accordance with the standards.

Figure 6:
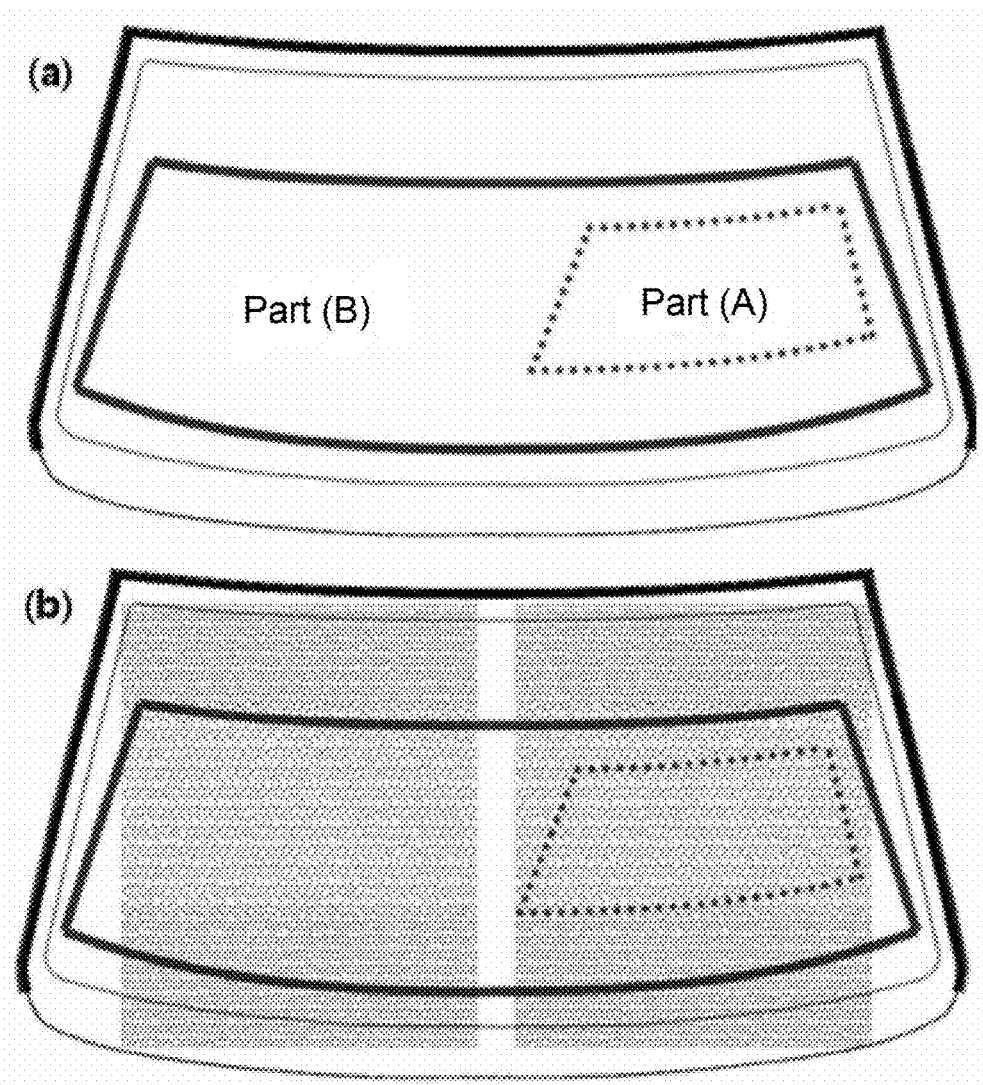
FIG. 6 illustrates an example in which the heating element according to the present invention is designed for a windshield of a vehicle.

Article 109 of the rule on the vehicle safety standards suggests a standard of removing moisture and frost by designating a driver's seat viewing part as part 'A' and the other parts comprising a passenger seat as part 'B'. The present invention may suggest a method of setting the heating value in part 'A' to a higher value. For example, a pattern as illustrated in FIG. 6 may be used.

In the present invention, the height of the lines constituting the conductive heating pattern may be from 0.2 μm to 20 μm. The distance between the lines constituting the conductive heating pattern may be designed according to the use thereof, and may be, for example, from 50 μm to 30 mm.

In the present invention, it is preferred that the substrate is transparent. In this case, the substrate has a visible light transmittance of 50% or more, preferably 75% or more. Specifically, as the substrate, glass may be used, and a plastic substrate or a plastic film may be used. When a plastic film is used, it is preferred that a glass substrate or a plastic substrate is attached to at least one surface of the substrate after the conductive heating pattern is formed. In this case, it is more preferred that a glass substrate or a plastic substrate is attached to a surface on which the conductive heating pattern of the substrate is formed. As the plastic substrate or film, a material known in the art may be used, and for example, a film having a visible light transmittance of 80% or more, such as polyethylene terephthalate (PET), polyvinylbutyral (PVB), polyethylene naphthalate (PEN), polyethersulfone (PES), polycarbonate (PC), and acetyl celluloid, is preferred. The thickness of the plastic film is preferably from 12.5 μm to 500 μm, and more preferably from 30 μm to 250 μm.

The substrate may have a form of a curved surface according to the use thereof.

In the present invention, the conductive heating pattern may be composed of a conductive material. For example, the conductive heating pattern may be composed of a metal line. Specifically, it is preferred that the conductive heating pattern comprises a metal having excellent thermal conductivity. The conductive heating material may have a resistivity value from 1 microOhm cm to 200 microOhm cm. As a specific example of the conductive heating pattern material, copper, silver, carbon nanotube (CNT), copper coated with silver, and the like may be used.

The total aperture ratio of the conductive heating pattern is preferably 90% or more. In addition, as described above, the conductive heating pattern of the heating element according to the present invention may have an aperture ratio deviation of 2% or less while having a total aperture ratio of 90% or more.

The heating element according to the present invention may be connected to a power source for heating, and a heating value at this time is from 100 W per m$^2$ to 1,000 W per m$^2$, preferably from 200 W per m² to 700 W per m². The heating element according to the present invention has excellent heating performance even at low voltage, for example, 30 V or less, preferably 20 V or less, and thus may be usefully used even in vehicles, and the like. The resistance in the heating element is 2 Ω/square or less, preferably 1 Ω/square or less, and more preferably 0.5 Ω/square or less. In this case, the resistance value obtained has the same meaning as the surface resistance.

A black pattern may be formed in order to conceal the bus bar. The black pattern may be printed using a paste containing cobalt oxide. In this case, as the printing method, a screen printing is suitable, and the thickness thereof may be set to 10 μm to 100 μm. The pattern line and the bus bar may also be formed before or after the black pattern is formed.

The heating element according to the present invention may comprise an additional substrate provided on a surface on which the conductive heating pattern of the substrate is provided. The aforementioned description on the substrate may be applied to the additional substrate.

A bonding film may be sandwiched between the conductive heating pattern and the additional substrate when the additional substrate is attached thereto. In the bonding process, temperature and pressure may be controlled.

In a specific exemplary embodiment, primary bonding is performed by inserting a bonding film between a substrate comprising the conductive heating pattern and an additional substrate, putting the assembly into a vacuum bag, and increasing temperature while reducing pressure, or increasing temperature using a hot roll to remove air therein. In this case, the pressure, the temperature, and the time may be different according to the type of bonding film, but it is possible to gradually increase the temperature from normal temperature to 100° C. at the pressure from 300 Torr to 700 Torr. In this case, it is preferred that the time is usually set to within 1 hour. The pre-bonded laminate subjected to the primary bonding is subjected to a secondary bonding process by an autoclaving process of adding pressure thereto and increasing temperature in an autoclave. The secondary bonding may be different according to the type of bonding film, but it is preferred that the secondary bonding is performed at a pressure of 140 bar or more and a temperature approximately from 130° C. to 150° C. for 1 hour to 3 hours, preferably about 2 hours, and then the laminate is slowly cooled.

In another specific exemplary embodiment, it is possible to use a method of bonding in one step using a vacuum laminator device unlike the aforementioned two-step bonding process. Bonding may be performed by increasing temperature step by step to 80° C. to 150° C., reducing pressure (~5 mbar) until 100° C. while slowly cooling, and then adding pressure (~1,000 mbar) thereto.

As a material for the bonding film, any material may be used as long as the material has bonding force and becomes transparent after bonding. For example, a PVB film, an EVA film, a PU film and the like may be used, but the material is not limited thereto. The thickness of the bonding film is not particularly limited, but is preferably from 100 μm to 800 μm.

The present invention also provides a method for manufacturing a heating element, comprising: forming a conductive heating pattern on a substrate; and forming two bus bars on the substrate so as to apply voltage to both ends of the conductive heating pattern, in which the conductive heating pattern comprises a border form of a closed figure, and is formed such that an average area of the closed figure is controlled in at least some regions of the conductive heating pattern according to a distance from the bus bar or along a longitudinal direction of the bus bar.

The description on the conductive heating pattern is the same as those described above.

The conductive heating pattern may also be formed by using a first method of directly printing the conductive heating pattern on the substrate, and then drying or sintering the substrate, a second method of laminating a metal thin film on the substrate, and then patterning the metal thin film, or a third method of forming a silver pattern on a substrate coated with a silver salt using a photography method, and then increasing the thickness of the line through plating until a desired surface resistance is obtained.

When a printing method as the first method among the methods is used, a paste comprising a thermal conductive material may be printed on the substrate by the printing method. When the printing method is used, cost is relatively low, the manufacturing process is also simple, the line width is thin, and a precise pattern line may be formed.

The printing method is not particularly limited, and a printing method such as offset printing, screen printing, and gravure printing may be used. For example, the offset printing may be performed by using a method in which an intaglio on which a pattern is engraved is filled with a paste, is subjected to a primary transfer with a silicone rubber called a blanket, and then is subjected to a secondary transfer by closely contacting the blanket with glass, but is not limited thereto.

Since most of the paste is transferred on glass due to the release property of the blanket, a separate blanket washing process is not required. The intaglio may be manufactured by precisely etching a soda lime glass on which a target pattern line is engraved, and metal or diamond-like carbon (DLC) coating may also be performed on the glass surface for durability thereof. The intaglio may also be manufactured by etching a metal plate.

In the present invention, in order to implement a more precise pattern line, the offset printing method is most preferred.

It is preferred that as the thermal conductive material, a metal having excellent thermal conductivity is used. For example, copper, silver, carbon nanotube (CNT), copper coated with silver, and the like may be used. In the present invention, the thermal conductive material may be used in the form of particles.

The paste may further comprise an organic binder in addition to the above-described thermal conductive material so as to easily perform the printing process. The organic binder may have a volatile property in the sintering process. Examples of the organic binder comprise a polyacrylic resin, a polyurethane-based resin, a polyester-based resin, a polyolefin-based resin, a polycarbonate-based resin, a cellulose resin, a polyimide-based resin, a polyethylene naphthalate-based resin, a modified epoxy and the like, but are not limited thereto.

In order to improve the attachment ability of the paste to the substrate such as glass, the paste may further comprise a glass frit. The glass frit may be selected from commercially available products, but an environmentally-friendly glass frit that does not comprise a lead component may be used. In this case, the size of the glass frit used may have an average diameter of 2 micrometers or less and the maximum diameter of 50 micrometers or less.

If necessary, a solvent may be further added to the paste. Examples of the solvent comprise butyl carbitol acetate, carbitol acetate, cyclohexanone, cellosolve acetate, terpineol, and the like, but the scope of the present invention is not limited by these examples.

In the present invention, when a paste comprising a conductive material, an organic binder, a glass frit, and a solvent is used, as the weight ratio of each component, the conductive material may be present in an amount from 50 to 90% by weight, the organic binder may be present in an amount from 1 to 20% by weight, the glass frit may be present in an amount from 0.1 to 10% by weight, and the solvent may be present in an amount of 1 to 20% by weight.

Furthermore, in order to improve the attachment ability of the paste to glass, the paste may further comprise a glass frit. If necessary, a solvent may be further added thereto.

The paste may be printed such that the line width of the line of the printing pattern after sintering is 30 µm or less, specifically from 0.1 µm to 30 µm. Further, the paste may be printed such that the distance between lines of the printing pattern after sintering is from 50 µm to 30 mm. Further, the paste may be printed such that the height of the line from the surface of the substrate is from 0.2 µm to 20 µm.

In a method of patterning a metal thin film after laminating the metal thin film on a substrate, which is the second method among the methods, various methods may be used as a method of laminating the metal thin film. For example, the metal thin film may also be attached to a substrate using an adhesive, and may also be formed on the substrate using a vacuum deposition method. As a method of patterning a metal line on a substrate on which a metal thin film is laminated, the metal thin film may also be formed by patterning an etching protective layer, and then etching a portion other than the protective layer. The etching protective layer may also be formed using a photolithography method, and may also be formed using an offset printing process.

BEST MODE

Hereinafter, preferred examples will be provided for better understanding of the present invention. However, the following examples are provided only for understanding the present invention more easily, but the content of the present invention is not limited thereby.

EXAMPLE

Example 1

A Cu layer having a thickness of 2 µm was formed on a polyurethane terephthalate (PET) film through a vapor deposition method. After an etching resist material was patterned on the film through a photolitho process, a conductive heating pattern region comprising a metal pattern having a line width from 5 µm to 8 µm and a line height of 2 µm was formed through an etching process. The conductive heating pattern was formed at with 20 cm wide and 15 cm long and 5 cm per region as illustrated in FIG. 1, and then was formed to have 20×10 cm² for each region by being extended by two times longitudinally as illustrated in FIG. 5. Bus bars were respectively provided on and under the conductive heating pattern, and as illustrated in FIG. 1, a pattern having a values of 158, 211, and 158 µm illustrated in FIG. 8, that is, a ratio of the square root of the area of the closed figure of 3:4:3 according to the distance from the bus bar was formed. When 5 V was applied to the bus bars, a current of 5.7 A flowed. 10 minutes before and after the voltage was applied thereto, the temperature difference of the film was measured using a thermal imaging camera (FLIR), and as a result, the temperature was increased by 19.6° C., 26.9° C., and 19.2° C. for each region. Since the increased temperature is proportional to the heating value, it can be seen that a heating value of 3:4:3, which is the same as the ratio of the square root of the area of the closed figure (3:4:3) according to the distance from the bus bar, was exhibited. In this case, when the transmittance for each region was measured, 89.3%, 89.3%, and 89.4% were obtained.

The invention claimed is:

1. A heating element comprising:
    a substrate;
    a conductive heating pattern provided on the substrate; and
    two bus bars provided so as to apply voltage to both ends of the conductive heating pattern, respectively,
    wherein the conductive heating pattern comprises a border form of a closed figure, and an average area of the closed figure is controlled in at least some regions of the conductive heating pattern according to a distance from the bus bar,
    wherein the conductive heating pattern comprises at least two regions having different average areas of the closed figure per unit area, and
    wherein a ratio of the average area of the closed figure per unit area among the regions is a value of 1.1 or more and less than 4.

2. The heating element of claim 1, wherein the conductive heating pattern comprises at least three regions having different average areas of the closed figure per unit area.

3. The heating element of claim 1, wherein a difference in aperture ratio between the regions is 5% or less.

4. The heating element of claim 3, wherein the aperture ratio for each region is 90% or more.

5. The heating element of claim 1, wherein the region comprises part 'A' and part 'B' in accordance with Article 109 of the rule on the vehicle safety standards, and wherein the part 'A' is a driver's seat viewing part and the part 'B' is a part comprising the driver's seat viewing part and a passenger's seat viewing part.

6. The heating element of claim 1, wherein a length of each of the lines constituting the border of the closed figure is from 100 µm to 800 µm, and a line width thereof is from 0.1 µm to 30 µm.

7. The heating element of claim 1, wherein the closed figure has a form in which an average distance between lines in a longitudinal direction is longer than an average distance between lines in a transverse direction.

8. The heating element of claim 1, wherein the conductive heating pattern is composed of a metal line.

9. The heating element of claim 1, wherein the closed figure comprises one or two or more of a closed figure having three vertices, a close figure having four vertices, a closed figure having five vertices, a closed figure having six vertices, a closed figure having seven vertices and a closed figure having eight vertices.

10. The heating element of claim 1, wherein the closed figure is composed of a closed figure having four vertices.

11. The heating element of claim 1, wherein the closed figure is composed of a closed figure having six vertices.

12. The heating element of claim 1, wherein the closed figure is a figure in which at least one of a polygon having at least three vertices, a position of a vertex of a polygon having at least three vertices, and a curvature degree of lines thereof is modified.

13. The heating element of claim 1, wherein the closed figure is a figure in which a position of each vertex of a polygon is changed in a specific unit region, a figure in which a line of a polygon is modified in a form where the vertices are connected to each other along a circumference of a circle by selecting the circle such that an angle between an origin of the circle among circles passing through two adjacent vertices of the polygon and straight lines each connecting two vertices of the polygon so as to be constant, or a combination thereof.

14. The heating element of claim 1, wherein the border of the closed figure comprises a straight line, a curved line, a zig-zag line or a combination thereof.

15. The heating element of claim 1, wherein the heating element has a transmittance deviation of 10% or less with respect to any circle having a diameter of 20 cm.

16. A windshield for a vehicle comprising the heating element of claim 1.

17. A method for manufacturing the heating element of claim 1, the method comprising:
   forming a conductive heating pattern on a substrate; and
   forming two bus bars on the substrate so as to apply voltage to both ends of the conductive heating pattern,
   wherein the conductive heating pattern comprises a border form of a closed figure, and is formed such that an average area of the closed figure is controlled in at least some regions of the conductive heating pattern according to a distance from the bus bar or along a longitudinal direction of the bus bar.

* * * * *